(12) United States Patent (10) Patent No.: US 8,473,699 B2
Browne et al. (45) Date of Patent: *Jun. 25, 2013

(54) FACILITATING DATA COMPRESSION DURING REPLICATION USING A COMPRESSIBLE CONFIGURATION BIT

(75) Inventors: Michael E. Browne, Staatsburg, NY (US); Nancy J. Finn, Stormville, NY (US); Christina Lara, Tucson, AZ (US); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,436

(22) Filed: Apr. 16, 2012

(65) Prior Publication Data

US 2012/0203987 A1 Aug. 9, 2012

Related U.S. Application Data

(63) Continuation of application No. 12/607,118, filed on Oct. 28, 2009.

(51) Int. Cl.
*G06F 12/00* (2006.01)
(52) U.S. Cl.
USPC ........... 711/162; 711/161; 707/610; 707/640; 707/661; 707/665; 707/667; 709/247; 714/4.11; 714/6.3
(58) Field of Classification Search
None
See application file for complete search history.

(56) References Cited

U.S. PATENT DOCUMENTS

| | | | |
|---|---|---|---|
| 6,134,062 A | 10/2000 | Blumenau | |
| 6,339,787 B1* | 1/2002 | Yohe et al. | 709/217 |
| 6,532,121 B1 | 3/2003 | Rust et al. | |
| 7,082,390 B2 | 7/2006 | Bergsten | |
| 7,185,222 B2 | 2/2007 | Burton et al. | |
| 7,200,603 B1 | 4/2007 | Hitz et al. | |
| 7,257,648 B2 | 8/2007 | McCartney et al. | |
| 7,277,431 B2 | 10/2007 | Walter et al. | |

(Continued)

OTHER PUBLICATIONS

Notification of Transmittal of the International Search Report and the Written Opinion for PCT Application No. PCT/EP2010/064537(PCT Publication No. WO 2011/015995), dated Apr. 12, 2011.

(Continued)

*Primary Examiner* — Christian P Chace
*Assistant Examiner* — Alan Otto
(74) *Attorney, Agent, or Firm* — Steven Chiu, Esq.; Kevin P. Radigan, Esq.; Heslin Rothenberg Farley & Mesiti P.C.

(57) ABSTRACT

A method is provided for facilitating data replication in a storage system. A logical volume of a first storage array of a replicated pair is preconfigured with one or more logical volume attributes, which include a compressible configuration bit that indicates whether data blocks to be stored to that logical volume are compressible during replication. Subsequently, with receipt of a data block at the first storage array to be stored to the logical volume, a check of the compressible configuration bit is made to determine whether the data block is compressible during replication, and if so, the data block is compressed for replication. The compressible configuration bit is placed into the payload region of the data packet being replicated to the second storage array. At the second storage array, the compressible configuration bit is used to determine whether to uncompress the replicated data block.

7 Claims, 6 Drawing Sheets

U.S. PATENT DOCUMENTS

| | | |
|---|---|---|
| 7,512,754 B1 | 3/2009 | Chaitanya et al. |
| 7,546,415 B2 | 6/2009 | Blinick et al. |
| 7,552,309 B2 | 6/2009 | Zohar et al. |
| 2006/0190643 A1 | 8/2006 | Kedem et al. |
| 2006/0206542 A1 | 9/2006 | Wolfgang et al. |
| 2007/0073941 A1 | 3/2007 | Brink et al. |
| 2007/0136541 A1 | 6/2007 | Herz et al. |
| 2008/0095192 A1 | 4/2008 | Collette et al. |
| 2008/0301164 A1 | 12/2008 | Isobe |

OTHER PUBLICATIONS

Browne, et al., Office Action for U.S. Appl. No. 12/607,118, filed Oct. 28, 2009 (U.S. Patent Publication No. 2011/0099344 A1), dated Aug. 17, 2012.

* cited by examiner

FACILITATING DATA COMPRESSION DURING REPLICATION USING A COMPRESSIBLE CONFIGURATION BIT

CROSS-REFERENCE TO RELATED APPLICATION

This application is a continuation of U.S. Ser. No. 12/607,118, entitled "FACILITATING DATA COMPRESSION DURING REPLICATION USING A COMPRESSIBLE CONFIGURATION BIT," filed Oct. 28, 2009, and published Apr. 28, 2011, as U.S. Patent Publication No. 2011/0099344 A1, and which is hereby incorporated herein by reference in its entirety.

BACKGROUND

The present invention relates in general to storage systems, storage controllers and data compression, and more particularly, to facilitating data compression during replication between storage arrays of a storage system.

In recent years, storage area networks (SANs) have become popular. In a storage area network, the storage units (or storage devices) are not locally attached to a particular host, but rather are connected to a host or series of hosts through a switch fabric, where each host can access each storage unit. In this manner, multiple hosts may share storage units so that storage space can be more readily allocated between the applications on the host(s).

In one example, a storage area network manages a plurality of disk drives arranged in an array according to a RAID (Redundant Array of Independent Disks) configuration. One or more logical volumes are formed in a physical storage array provided by the plurality of disk drives, and these logical volumes are provided to the host system(s).

Since this type of storage system handles large volumes of data, data compression is often employed (e.g., during replication) to increase performance of data transfer rates beyond a default rate for uncompressed data itself. Certain existing storage controller implementations utilize an all-or-nothing approach to compressing data before transferring data across a link. If compression is activated, then the storage controller attempts to compress every frame of data, whether it is compressible, non-compressible or already compressed. The result can be degradation in data transfer rates due to lost performance from, for example, attempting to compress non-compressible frames of data, prior to transfer of the data across the link.

BRIEF SUMMARY

In one aspect, a method of facilitating replication of data in a storage system is provided. The method includes: configuring a logical volume of a storage unit of a first storage array of the storage system with at least one storage volume attribute, which comprises a compressible configuration bit, the compressible configuration bit indicating whether one or more data blocks to be stored to the logical volume are compressible during replication. Receiving a data block at the first storage array to be stored to the logical volume of the storage unit; and checking the compressible configuration bit associated with the logical volume, and based thereon, determining whether to compress the data block during replication thereof from the first storage array to a second storage array of the storage system.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Reference is made below to the drawings (which are not drawn to scale for ease of understanding), wherein the same reference number is used throughout different figures to designate the same or similar components.

Figure 1:
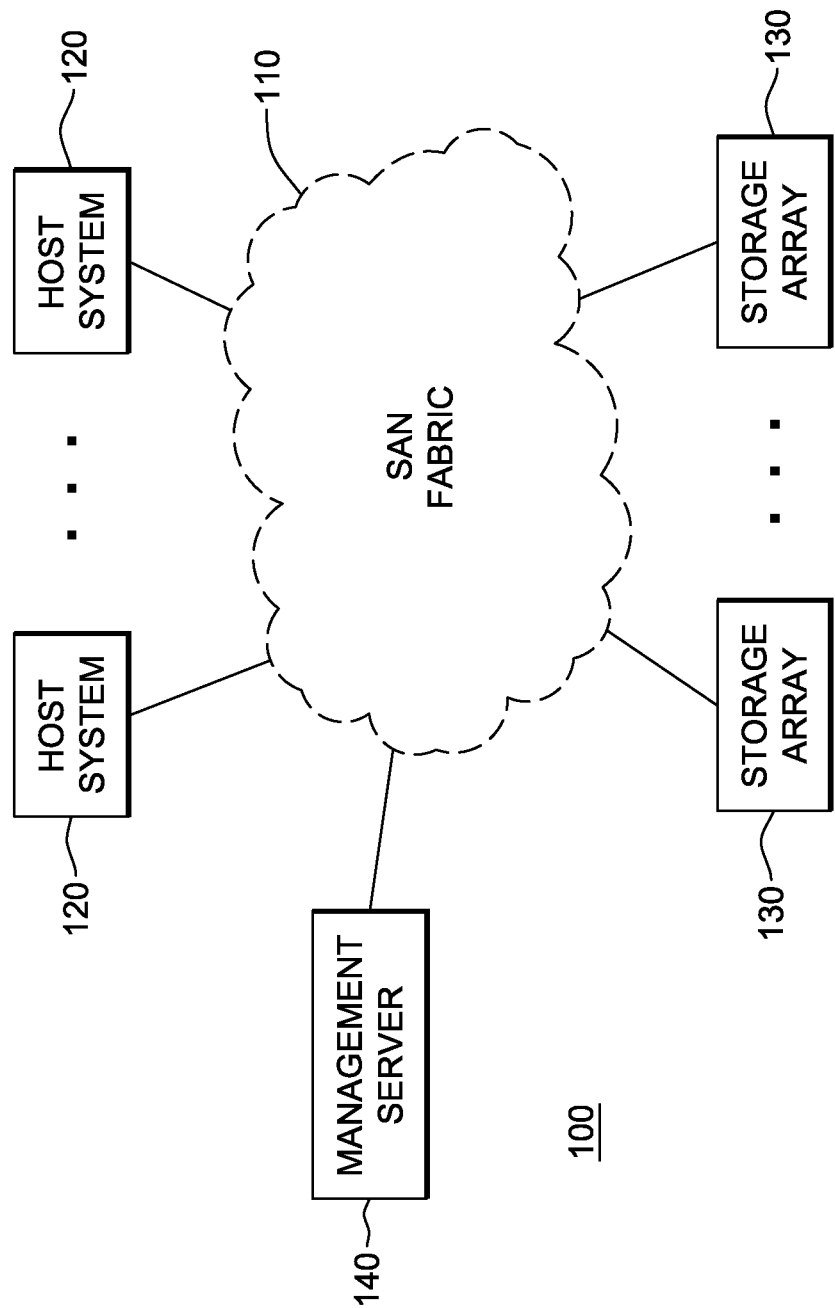
FIG. 1 is a block diagram illustrating one embodiment of a storage system to utilize a data compression and replication facility, in accordance with an aspect of the present invention.

FIG. 1 depicts one embodiment of a data storage system 100 comprising a storage area network. Central to the storage area network is one or more storage area network (SAN) fabrics 110, each of which is formed of a series of routers or switches, such as Fibre Channel switches according to the Fibre Channel specifications. These switches are interconnected to provide a full mesh (or fabric), allowing any node to connect to any other node. Various nodes and devices can be connected to SAN fabric 110. For example, a plurality of host systems 120 are typically coupled to SAN fabric 110 to communicate through the fabric to other devices. These other devices include one or more storage arrays 130 (described below). In addition, a management server 140 is shown connected to SAN fabric 110 for managing storage arrays 130. In an alternate embodiment, a local area network could be employed to couple the management server 140 to storage arrays 130, without relying on SAN fabric 110.

Each host system 120 is a computer device comprising information processing resources such as a central processing unit and memory, and may be configured, for example, from a personal computer, workstation, mainframe, etc.

Figure 2:
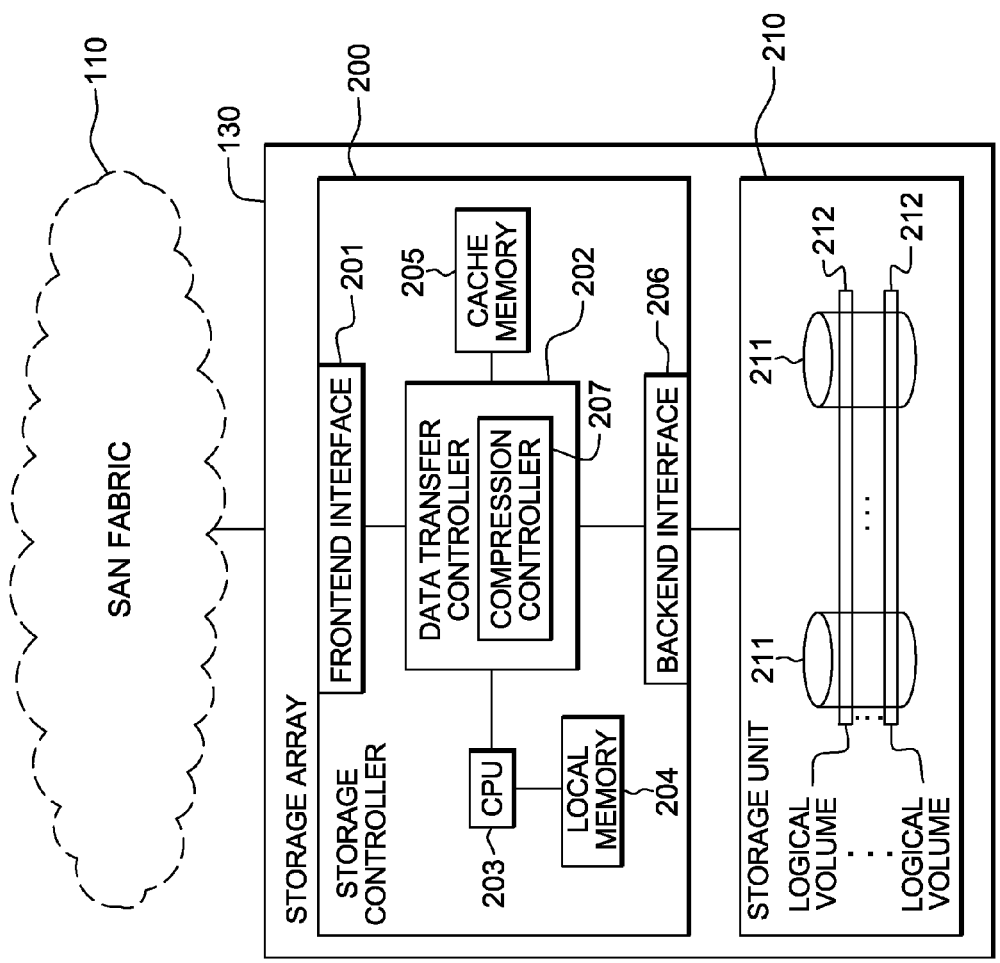
FIG. 2 is a block diagram of one embodiment of a storage controller of the storage system of FIG. 1, in accordance with an aspect of the present invention.

FIG. 2 illustrates one embodiment of a storage array 130 of a storage system, such as depicted in FIG. 1. As illustrated, storage array 130 is connected to storage area network (SAN) fabric 110, and includes a storage controller 200, and a storage unit 210. Storage controller 200 comprises, in the illustrated embodiment, a frontend interface 201, a data transfer controller 202, a CPU 203, local memory 204, cache memory 205 and a backend interface 206. As shown, data transfer controller 202 includes a compression controller 207 (which is distinct from an encryption/decryption controller (not shown), which also may conventionally be included within the data transfer controller of the storage controller).

Storage controller 200 controls a plurality of storage modules of storage unit 210, such as a plurality of hard disk drives 211. In one example, control of the storage unit is based on a RAID level defined in a so-called RAID system. In an RAID system, a plurality of hard disk drives 211 are managed as a single RAID group. A plurality of logical volumes 212 are defined in the RAID group as access units from the host system 120 (FIG. 1). A LUN (logical unit number) is allocated to each logical volume 212.

Frontend interface 201 is a controller for controlling the interface with one or more host systems and, for instance, has a function for receiving a data block input/output (I/O) request from a host system based (for example) on the Fibre Channel protocol. Frontend interface 201 further includes controls for sending and receiving control signals to and from the management server of the storage area network. CPU 203 is a processor which controls a write access or read access to the plurality of hard disk drives 211 in response to a data I/O request from a host system. Further, CPU 203 executes processing according to various commands sent from the management server 140 (see FIG. 1), and the processing of programs stored in local memory 204. Local memory 204 stores various types of data and programs to facilitate control of the storage array 130.

Data transfer controller 202 connects cache memory 205, frontend interface 201, backend interface 206, and CPU 203. Data transfer controller 202 again includes compression controller 207, and controls the data transfer between a host system (see FIG. 1) coupled to the SAN fabric 110 and the hard disk drives 211 of storage unit 210.

Cache memory 205 is a buffer memory for temporarily storing write data to be written into the hard disk drives 211, read data being read from the hard disk drives 211 and data to be sent to the cache memory of another storage controller during a replication operation. Compression controller 207 is a controller for reading and compressing (or uncompressing) data temporarily stored in cache memory 205.

Backend interface 206 is a controller for controlling the interface with the hard disk drives 211, and for instance, has a function of controlling the data I/O requests to the hard disk drives 211 based on a protocol for controlling the hard disk drives.

Hard disk drives 211 are storage devices configured, by way of example, from FC (Fibre Channel) disk drives, SATA (Serial Advanced Technology Attachment) disk drives, PATA (Parallel Advanced Technology Attachment) disk drives, FATA (Fibre Advanced Technology Attachment) disk drives, SAS (Serial Advanced SCSI) disk drives, SCSI (Small Computer System Interface) disk drives, etc.

Referring to FIG. 1, management server 140 is, for instance, a computer system comprising hardware resources such as a CPU, a memory and a display. Employing management server 140, input operations may be performed by a system operator. The system operator is able to send commands for managing one or more of the storage arrays. These commands may include, for example, a command for increasing or decreasing the number of hard disk drives 211, or changing the RAID configuration, a command for installing the CPU's micro-programs in local memory, a command for confirming the operational status of a storage array, or a command for defining one or more logical volumes 212 within storage unit 210.

In one embodiment, each storage array 130 is configured as described above in connection with the storage array depicted in FIG. 2. When a write access is requested from the host system, data transfer controller 202 foremost writes the data received from the host system via frontend interface 201 into cache memory 205. Subsequently, data transfer controller 202 transfers the data to backend interface 206 in order to perform asynchronous writing to the hard disk drives 211. When read access is requested from the host system, data transfer controller 202 writes the data read from the hard disk drives 211 via backend interface 206 into cache memory 205, and subsequently transfers the data to the frontend interface 201. Frontend interface 201 then transfers the compressed data to the requesting host system.

For data availability, data replication is often employed within a storage system such as depicted in FIGS. 1 & 2. Data replication occurs between preconfigured replication pairs of storage arrays of the storage system (e.g., between replication pairs of logical volumes), and is generally, a point-to-point transfer of data from one storage array to another storage array. When possible, data compression increases data transfer rates during replication beyond a default rate for uncompressed data. However, the types of data that can be compressed vary. Certain storage controllers available today utilize an all-or-nothing approach to compressing data during replication from one storage array to another storage array. For example, EMC Corporation, headquartered in Hopkinton, Mass., USA, offers a Symmetrix DMX-4 series high-end storage system with storage controllers that have a built-in capability to automatically attempt to compress data during replication. However, when compression is enabled, such storage controllers attempt to compress every data block, whether it is compressible or non-compressible. The storage controller has no knowledge or any way of determining whether or not the replicated data is compressible for replication.

Presented herein is a solution. Specifically, a data compression and replication facility is disclosed, which provides the storage controller with processing intelligence to selectively compress a data block being replicated from a first storage array to a second storage array of the storage system if it is in fact compressible. This ability to know which data blocks are compressible before attempting compression improves data transfer rates between the storage arrays and thus, facilitates the replication operation.

Figure 3:
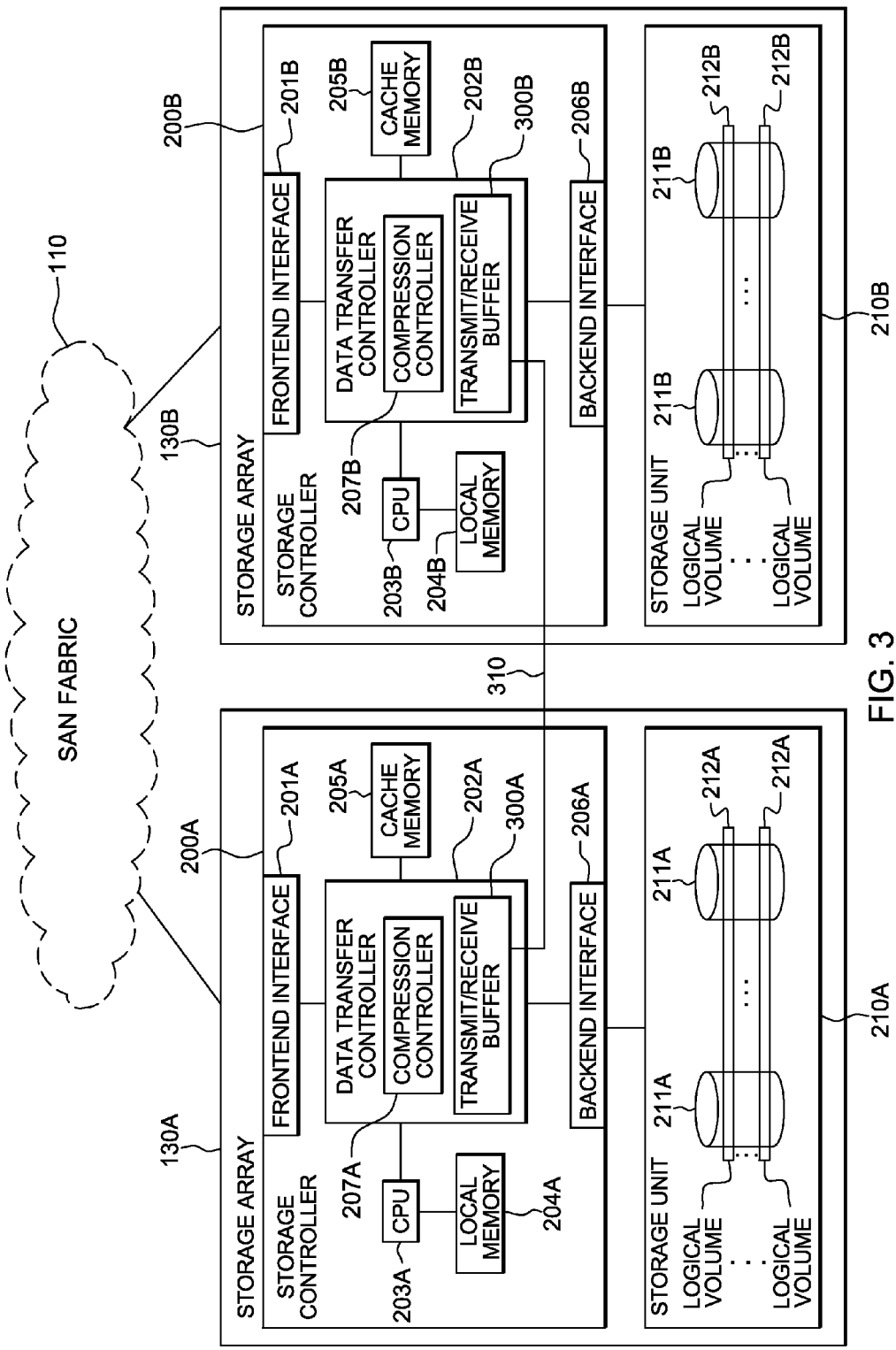
FIG. 3 is a block diagram illustrating two storage arrays logically coupled via a replication link, and utilizing a data compression and replication facility, in accordance with an aspect of the present invention.

FIG. 3 illustrates a replicated pair of storage arrays in a storage system comprising (in one embodiment) multiple storage subsystems. As illustrated, the replicated pair includes a first storage array 130A and a second storage array 130B, each coupled to storage area network fabric 110. First storage array 130A and second storage array 130B are each configured as described above in connection with the storage area array of FIG. 2, with reference "A" being added to the reference numerals for the first storage array 130A, and reference "B" being added to the reference numerals for the second storage array 130B. In one embodiment, the first storage array 130A and the second storage array 130B are in different storage subsystems of a set of storage subsystems, that are in the same, or more typically, different geographic locations.

In FIG. 3, first storage array 130A is shown to include a transmit/receive buffer 300A within data transfer controller 202A, and second storage array 130B includes a transmit/receive buffer 300B within data transfer controller 202B. A replication link 310 couples (in one example) the transmit/receive buffers 300A, 300B. This replication link 310 may comprise a physical link, or a logical representation of a link, for example, through SAN fabric 110. Further, although shown within data transfer controllers 202A, 202B, the transmit/receive buffers 300A, 300B might reside elsewhere; for example, within the respective cache memories 205A, 205B of the storage controllers 200A, 200B.

As noted, during replication of a data block from first storage array 130A to second storage array 130B, compression controller 207A conventionally attempts (in an all-or-nothing approach) to compress every data block being replicated. This slows the data transfer rate in those cases where the data block is non-compressible data. To address this issue, a new bit, referred to herein as the compressible configuration bit, is employed, both as a storage volume attribute associated with a logical volume where the data block is to be stored, as well as part of a header string placed in the data payload region of the data packet being replicated from the first storage array to the second storage array. This use of the compressible configuration bit is described further below with reference to FIG. 4.

Figure 4:
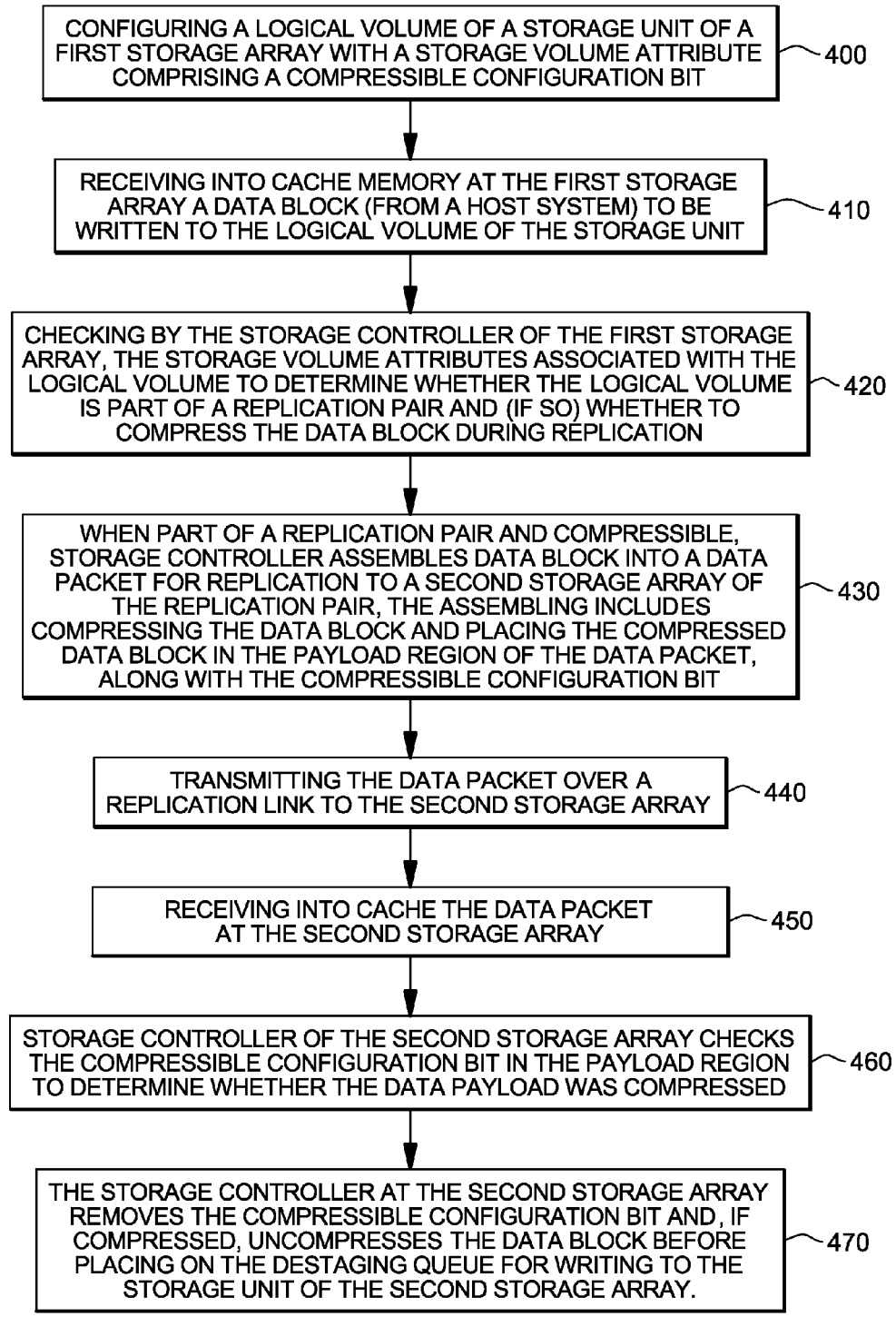
FIG. 4 depicts one embodiment of a process for facilitating data employing a compressible configuration bit, in accordance with an aspect of the present invention.

In FIG. 4, a process is depicted for facilitating replication of data in a storage system. The process, which is described below with reference to the storage system of FIG. 1 and the replicated pair of FIG. 3, includes configuring a logical volume of a storage unit of a first storage array with one or more storage volume attributes that include a compressible configuration bit (STEP 400). For example, a system administrator might employ the management server 140 (see FIG. 1) to instruct the first storage array to associate a new storage volume attribute with one or more of the logical volumes of the storage unit of the storage array. This new storage volume attribute that includes the compressible configuration bit may be set by the system administrator ON or OFF for each particular logical volume within the storage unit of the first storage array. Alternatively, the compressible configuration bit could be ON or OFF by default for a particular logical volume, depending upon the implementation. In the example described below, it is assumed that the compressible configuration bit is set ON, that is, any data block to be written to the particular logical volume is defined to be compressible during replication.

Subsequently, a write data block request is received at the first storage array with a particular block address in one of the logical volumes of the storage unit of the first storage array. The write data block request is received from a host system (in one example), through the SAN fabric to the first storage array 130A (see FIG. 3), into storage controller 202A via frontend interface 201A. The data transfer controller 202A then places the received data block into cache memory 205A (STEP 410, FIG. 4).

Storage controller 200A (FIG. 3) checks the storage volume attributes associated with the logical volume to which the data block is to be written, and determines whether the logical volume is part of a replication pair and (if so), whether to compress the data block during replication (STEP 420). Indicating that the logical volume is part of a replication pair is (in one embodiment) via the new storage volume attribute associated with the logical volume (which includes the compressible configuration bit that has been set as described above). By way of example, assume that the compressible configuration bit is set ON, meaning that any data block to be storated to that logical volume is compressible during replication, and further, assume that the storage controller 200A has a default setting where the storage controller does not attempt to compress data blocks during replication. In this case, the compressible configuration bit being set ON means that the data block will be compressed by the storage controller during replication. (Alternatively, the storage controller could be set by default to compress data blocks automatically during replication, in which case the compressible configuration bit could be used to override the automatic compression for those data blocks that are non-compressible.)

As a further aspect, the replicated data can include an indication of whether the data block was compressed by the first storage array during replication to the second storage array. To accomplish this, the storage controller could either immediately place a compressible configuration bit in the data payload region of the data packet being assembled for replication (e.g., wrapped in an appropriate string placed into the data payload region of the packet), or set a bit in a trackable table for use in subsequently inserting a string into the data payload region of the packet when assembling the data packet for replication. In one example, the data packet is a Fibre Channel packet assembled for transmission across a Fibre Channel replication link logically or physically coupling storage controller 200A (FIG. 3) of first storage array 130A and storage controller 200B of second storage array 130B.

Figure 5:
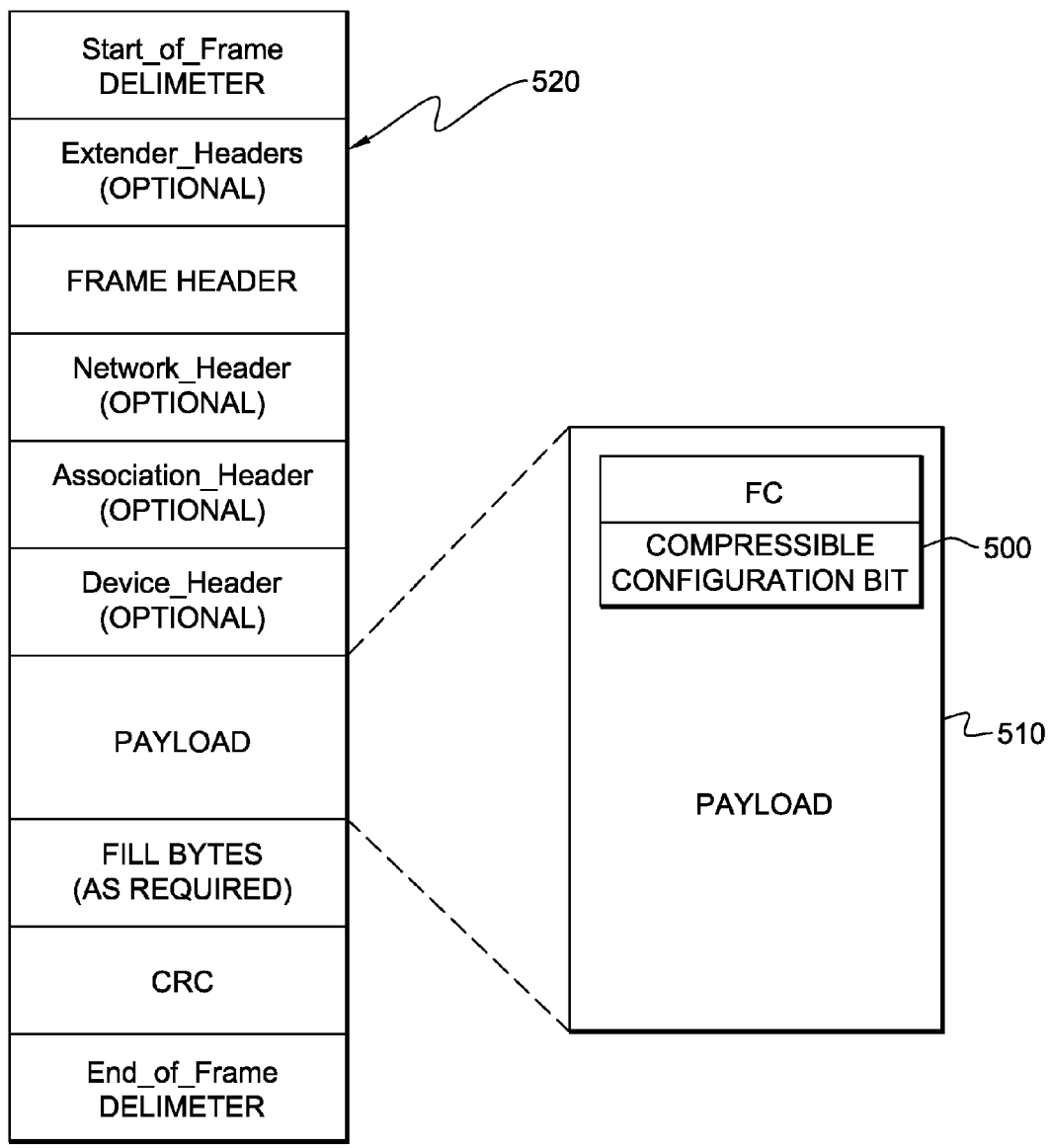
FIG. 5 depicts one example of a data packet format for replication and illustrating a compressible configuration bit inserted into the data payload region of the data packet, in accordance with an aspect of the present invention.

FIG. 5 illustrates one example of a compressible configuration bit 500 (e.g., inserted as a reference string) into the data payload region 510 of a data packet frame 520 being replicated from the first storage array to the second storage array. In this example, it is assumed that the data packet is a Fibre Channel (FC) data packet being transmitted across a Fibre Channel link. This implementation, however, is provided by way of example only. Note that, conventionally, the frame header information resides outside of the data payload region of the data packet, as defined by existing Fibre Channel specification. In accordance with the present invention, however, the reference string containing the compressible configuration bit is inserted into the data payload region (specified by the packet protocol to receive the data block), and therefore, no change to the existing packet header configuration is required, e.g., no change to the existing Fibre Channel specification is required to implement the present invention.

Continuing with FIG. 4, when the logical volume into which the data block is to be placed is part of a replication pair, and the logical volume is configured with a compressible configuration bit set for compression of the data block during replication, the storage controller schedules the data block for actual replication on a link and assembles the data block into a data packet for replication on the link (STEP 430). This assembling includes (in this example) compressing the data block and placing the compressed data block in the data payload region of the data packet, along with the compressible configuration bit (as illustrated in FIG. 5) (STEP 440, FIG. 4). In one embodiment, the data packet is placed into the transmit/receive buffer 300A (FIG. 3) of the storage controller for transmission of the data packet over replication link 310 to second storage array 130B, and in particular, to transmit/receive buffer 300B of data transfer controller 202B of storage controller 200B.

Data transfer controller 200B (FIG. 3) of the second storage array receives the data packet into cache memory 205B (STEP 450, FIG. 4), and checks whether the compressible configuration bit in the reference string in the data payload region of the data packet indicates that the data block was compressed prior to replication (STEP 460). The storage controller strips the compressible configuration bit from the payload region, and if the data was compressed during replication, uncompresses the data block prior to placing the data block on the de-staging queue in the second storage array for writing of the data to storage unit 210B (FIG. 3) of the second storage array 130B (STEP 470, FIG. 4).

Those skilled in the art will note from the above description that the data block replication facility presented herein provides processing intelligence to the storage controller that allows the storage controller to avoid, for example, attempting to compress non-compressible data blocks during replication. Data that is determined to be compressible via the compressible configuration bit associated with the logical volume to which the data is to be stored will automatically be compressed by the storage controller before replication, while data that is non-compressible (as determined by the compressible configuration bit) can immediately be transmitted through the replication link, thereby enhancing replication rates. The compressible configuration bit described herein is both a storage volume attribute associated with the logical volume to which a data block is to be stored, and part of a reference string placed into the data payload region of the data packet assembled during replication of the data block from the first storage array to the second storage array of a replication pair. Advantageously, the data block replication facility described herein is independent of various implementations of the Fibre Channel standard or other link standards.

In an alternate implementation, the data storage system may ensure that replicated logical volume pairs are guaranteed to always have matching compressible configuration bit attributes. This would require that there be no window of time in which the compressible configuration bits associated with the logical volumes in the replicated logical volume pair mismatch. In such a case, the compressible configuration bit need not be included as part of the reference string incorporated into the data payload region of the packet assembled during replication of the data block from the first storage array to the second storage array of the replicated pair. The second, receiving storage array in this example would check the storage volume attributes associated with its respective logical volume to determine whether the compressible configuration bit was set, and then act accordingly on the received replicated data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
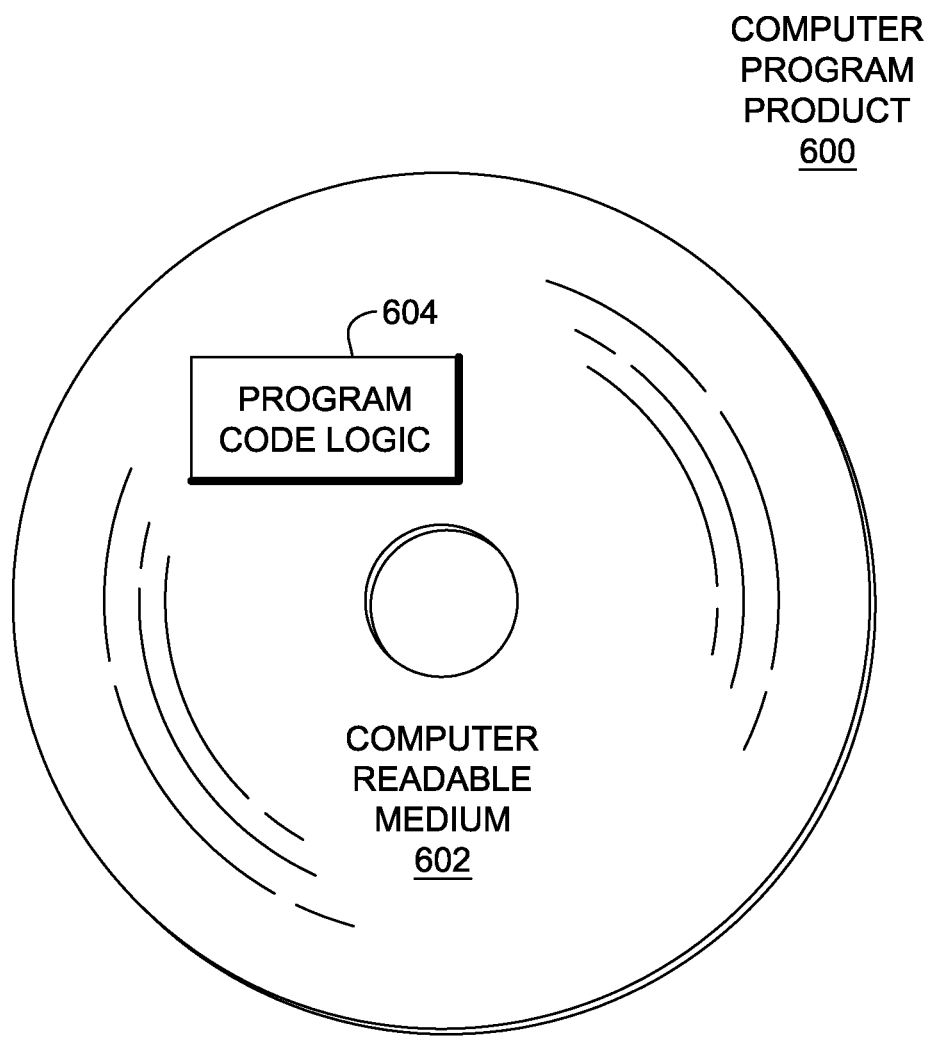
FIG. 6 depicts one embodiment of a computer program product incorporating one or more aspects of the present invention.

Referring now to FIG. 6, in one example, a computer program product 600 includes, for instance, one or more computer readable media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating replication of data in a storage system, the method comprising:
    configuring a logical volume of a storage unit of a first storage array of the storage system with at least one logical volume attribute, the at least one logical volume attribute comprising a compressible configuration bit indicating whether all data blocks to be stored to the logical volume are compressible during replication thereof to a second storage array of the storage system;
    receiving a data block at the first storage array to be stored to the logical volume of the storage unit of the first storage array; and checking the compressible configuration bit of the at least one logical volume attribute with which the logical volume is configured, and based thereon, determining whether to compress the data block during replication thereof from the first storage array to the second storage array of the storage system.

2. The method of claim 1, wherein the method further comprises replicating the data block from the first storage array to the second storage array, the replicating comprising placing the compressible configuration bit into a data payload region of a data packet for transmission of the data block from the first storage array to the second storage array.

3. The method of claim 2, wherein the replicating comprises compressing the data block into a compressed data block at the first storage array and placing the compressed data block into the data payload region of the data packet, the compressing occurring based on the compressible configuration bit indicating that the data block is compressible during replication.

4. The method of claim 2, wherein the replicating comprises replicating the data block from the first storage array to the second storage array without compression of the data block based on the checking of the compressible configuration bit indicating that the data block is non-compressible during replication.

5. The method of claim 2, wherein the storage system further comprises a replication link coupling the first storage array and the second storage array, and wherein the replicating comprises transmitting the data packet from the first storage array to the second storage array across the replication link.

6. The method of claim 5, wherein the replication link comprises a Fibre Channel link, and wherein the placing comprises placing the compressible configuration bit in the data payload region of the data packet without requiring modification to the Fibre Channel protocol, wherein the data packet is a Fibre Channel data packet.

7. The method of claim 2, further comprising receiving the data packet at the second storage array, checking the data payload region of the data packet for the compressible configuration bit, and if set, uncompressing the data block at the second storage array, and discarding the compressible configuration bit at the second storage array, and writing the data block to a logical volume of a storage unit of the second storage array.

* * * * *